United States Patent
Li et al.

(10) Patent No.: US 10,233,707 B2
(45) Date of Patent: Mar. 19, 2019

(54) SYSTEM AND PROCESS FOR MUD SOLID CONTROL

(71) Applicant: Jingnan Zhang, Chengdu (CN)

(72) Inventors: Yujia Li, Chengdu (CN); Xi Fang, Chengdu (CN); Jingnan Zhang, Chengdu (CN)

(73) Assignee: Jingnan Zhang, Chengdu, Sichuan (CN)

( * ) Notice: Subject to any disclaimer, the term of this patent is extended or adjusted under 35 U.S.C. 154(b) by 0 days.

(21) Appl. No.: 15/527,255

(22) PCT Filed: Nov. 24, 2015

(86) PCT No.: PCT/CN2015/095357
§ 371 (c)(1),
(2) Date: May 16, 2017

(87) PCT Pub. No.: WO2016/119516
PCT Pub. Date: Aug. 4, 2016

(65) Prior Publication Data
US 2018/0016856 A1    Jan. 18, 2018

(30) Foreign Application Priority Data
Jan. 30, 2015    (CN) .......................... 2015 1 0047718

(51) Int. Cl.
*E21B 21/06* (2006.01)
*B07B 1/26* (2006.01)
(Continued)

(52) U.S. Cl.
CPC .......... *E21B 21/066* (2013.01); *B01D 33/033* (2013.01); *B01D 33/0376* (2013.01);
(Continued)

(58) Field of Classification Search
None
See application file for complete search history.

(56) References Cited

U.S. PATENT DOCUMENTS 2,312,477 A * 3/1943 Pollitz ..................... B07B 1/284
209/329
4,634,535 A * 1/1987 Lott ....................... B01D 21/00
210/780
(Continued)

FOREIGN PATENT DOCUMENTS

CN           1450244 A      10/2003
CN         104001665 A       8/2014
(Continued)

OTHER PUBLICATIONS

International Searching Authority, Search Report issued in International Application No. PCT/CN2015/095357 dated Aug. 4, 2016 and English language translation (6 pages).
(Continued)

*Primary Examiner* — Robert J Popovics
(74) *Attorney, Agent, or Firm* — Wood Herron & Evans LLP

(57) ABSTRACT

A system for mud solid control includes a translational elliptical multilayer ultra-wide screen shaker, a degasser, a solid-liquid separator, a large capacity centrifugal machine and a collector for solid shales. The solid-liquid separator includes a base which is provided with a feed tank and vibrating supports. A vibrating tank is fixed to the vibrating supports, and screen drums, vibration motors and an anti-vibration driving motor are assembled on the vibrating tank. The anti-vibration driving motor is connected to the screen drums. Each of the screen drums includes an inner drum, an intermediate drum and an outer drum. The system and a corresponding process thereof can greatly simply and improve the process for mud solid control and relevant
(Continued)

devices, improve usage effect, reduce cost, save electrical power, reduce occupied area and simply maintenance and management of devices involved.

3 Claims, 2 Drawing Sheets

(51) Int. Cl.
| | | |
|---|---|---|
| *B01D 33/37* | (2006.01) | |
| *B01D 33/03* | (2006.01) | |
| *B01D 33/42* | (2006.01) | |
| *E21B 21/08* | (2006.01) | |
| *B07B 1/46* | (2006.01) | |
| *B01D 33/82* | (2006.01) | |

(52) U.S. Cl.
CPC ............ *B01D 33/37* (2013.01); *B01D 33/42* (2013.01); *B07B 1/26* (2013.01); *E21B 21/065* (2013.01); *E21B 21/067* (2013.01); *E21B 21/08* (2013.01); *B01D 33/82* (2013.01); *B07B 1/4663* (2013.01)

(56) References Cited

U.S. PATENT DOCUMENTS

| | | | | |
|---|---|---|---|---|
| 4,639,258 A * | 1/1987 | Schellstede | ........... | E21B 21/066 175/66 |
| 4,750,920 A * | 6/1988 | Manuel | ............. | B01D 19/0052 210/400 |
| 5,199,997 A * | 4/1993 | Stowe | ................ | B01D 11/0226 134/25.1 |
| 5,392,925 A * | 2/1995 | Seyffert | ................ | B07B 1/46 209/403 |
| 5,582,727 A * | 12/1996 | Foster | .................. | B01D 21/267 209/322 |
| 5,641,070 A * | 6/1997 | Seyffert | ............. | B01D 33/0346 209/314 |
| 5,971,159 A * | 10/1999 | Leone | ................ | B01D 29/012 209/399 |
| 6,073,709 A * | 6/2000 | Hensley | .................. | E21B 21/06 166/267 |
| 6,106,733 A * | 8/2000 | Wood | .................... | E21B 21/066 175/206 |
| 6,110,367 A * | 8/2000 | Jensen | .................. | E21B 21/065 175/206 |
| 6,152,307 A * | 11/2000 | Adams | ................ | B01D 29/012 209/403 |
| 6,186,337 B1 * | 2/2001 | Adams | ............. | B01D 33/0384 209/401 |
| 6,267,247 B1 * | 7/2001 | Seyffert | ............... | B01D 29/012 209/403 |
| 6,269,953 B1 * | 8/2001 | Seyffert | ............... | B01D 29/012 209/399 |
| 6,290,068 B1 * | 9/2001 | Adams | ................ | B01D 29/012 209/401 |
| 6,325,216 B1 * | 12/2001 | Seyffert | ............... | B01D 29/012 209/399 |
| 6,371,301 B1 * | 4/2002 | Schulte | ................ | B01D 33/033 209/405 |
| 6,371,302 B1 * | 4/2002 | Adams | ................ | B01D 29/012 209/401 |
| 6,454,099 B1 * | 9/2002 | Adams | ................ | B01D 29/012 209/399 |
| 6,565,698 B1 * | 5/2003 | Adams | ................ | B01D 29/012 156/290 |
| 6,607,080 B2 * | 8/2003 | Winkler | ............... | B01D 29/012 209/314 |
| 6,679,385 B2 * | 1/2004 | Suter | ........................ | B07B 1/42 209/365.4 |
| 6,722,504 B2 * | 4/2004 | Schulte | ................ | B01D 29/012 209/359 |
| 6,808,626 B2 * | 10/2004 | Kulbeth | ............. | B01D 21/0018 175/206 |
| 6,823,238 B1 * | 11/2004 | Hensley | .................. | E21B 21/06 210/113 |
| 6,868,972 B2 * | 3/2005 | Seyffert | ............. | B01D 33/0376 209/254 |
| 7,198,156 B2 * | 4/2007 | Schulte | ................ | B01D 33/033 209/309 |
| 7,216,767 B2 * | 5/2007 | Schulte | ................ | B01D 33/033 209/309 |
| 7,278,540 B2 * | 10/2007 | Stone | ................. | B01D 33/0376 209/309 |
| 7,331,469 B2 * | 2/2008 | Padalino | ........... | B01D 33/0376 209/413 |
| 7,514,011 B2 * | 4/2009 | Kulbeth | ............. | B01D 21/0045 175/206 |
| 7,520,391 B2 * | 4/2009 | Schulte, Jr. | .......... | B01D 29/012 209/412 |
| 7,571,817 B2 * | 8/2009 | Scott | .................. | B01D 33/0376 209/404 |
| 7,896,162 B2 * | 3/2011 | Bailey | ................ | B01D 33/0338 209/254 |
| 8,316,557 B2 * | 11/2012 | Burnett | ...................... | F26B 7/00 175/207 |
| 8,453,844 B2 * | 6/2013 | Bailey | ................ | B01D 33/0338 209/317 |
| 8,556,083 B2 * | 10/2013 | Burnett | ............. | B01D 33/0376 209/315 |
| 8,561,805 B2 * | 10/2013 | Scott | ................ | B01D 33/0315 209/555 |
| 8,613,360 B2 * | 12/2013 | Carr | ....................... | E21B 21/065 209/591 |
| 8,695,809 B2 * | 4/2014 | Sherwood | ............... | E21B 21/01 175/206 |
| 9,004,288 B2 * | 4/2015 | Carr | ...................... | E21B 21/065 209/591 |
| 9,073,104 B2 * | 7/2015 | Burnett | ...................... | B09B 3/00 |
| 9,079,222 B2 * | 7/2015 | Burnett | ............. | B01D 33/0376 |
| 9,677,353 B2 * | 6/2017 | Burnett | ............. | B01D 33/0376 |
| 2006/0113220 A1 * | 6/2006 | Scott | ................. | B01D 21/0012 209/250 |
| 2007/0108103 A1 * | 5/2007 | Burnett | ............. | B01D 21/0012 209/17 |
| 2007/0108104 A1 * | 5/2007 | Burnett | ............. | B01D 21/0012 209/17 |
| 2007/0109800 A1 * | 5/2007 | Callahan | ................ | B60K 37/06 362/459 |
| 2008/0078699 A1 * | 4/2008 | Carr | ...................... | E21B 21/065 209/233 |
| 2009/0120846 A1 * | 5/2009 | Burnett | ............. | B01D 33/0116 209/44 |
| 2013/0092637 A1 * | 4/2013 | Pomerleau | ................ | B07B 1/46 210/780 |
| 2013/0228532 A1 * | 9/2013 | Carr | ...................... | E21B 21/065 210/780 |
| 2014/0091028 A1 * | 4/2014 | Pomerleau | ................ | B07B 1/46 210/383 |
| 2014/0339178 A1 * | 11/2014 | Carr | ...................... | E21B 21/065 210/780 |
| 2015/0176351 A1 * | 6/2015 | Carr | ...................... | E21B 21/065 210/785 |
| 2015/0204151 A1 * | 7/2015 | Pomerleau | ......... | B01D 33/0353 210/780 |
| 2015/0308202 A1 * | 10/2015 | Carr | ...................... | E21B 21/065 210/741 |
| 2015/0337609 A9 * | 11/2015 | Carr | ...................... | E21B 21/065 210/785 |

(56) References Cited

U.S. PATENT DOCUMENTS

| | | | |
|---|---|---|---|
| 2016/0023141 A1* | 1/2016 | Pomerleau | B01D 33/0353 210/780 |
| 2016/0184741 A1* | 6/2016 | Zazula | B01D 21/262 210/801 |
| 2018/0016856 A1* | 1/2018 | Li | E21B 21/066 |

FOREIGN PATENT DOCUMENTS

| | | |
|---|---|---|
| CN | 104060955 A | 9/2014 |
| CN | 104314490 A | 1/2015 |
| CN | 104612608 A | 5/2015 |
| CN | 204436298 U | 7/2015 |
| WO | 2014145630 A1 | 9/2014 |

OTHER PUBLICATIONS

Pei, Jianzhong, "Optimization of Solid Control System of Drilling Fluid," Oil Drilling & Production Technology, Mar. 31, 2012, vol. 34, No. 2, pp. 23-28 (ISSN: 1000-7393) (6 pages).

\* cited by examiner

SYSTEM AND PROCESS FOR MUD SOLID CONTROL

CROSS-REFERENCE TO RELATED APPLICATIONS

This application is a national phase of PCT/CN2015/095357, filed on Nov. 24, 2015, which claims priority to Chinese Application No. 201510047718.0, which was filed Jan. 30, 2015. These prior applications are incorporated herein by reference in their entireties.

TECHNICAL FIELD

The present invention relates to a new system and a new process for mud solid control.

BACKGROUND

With increasing of the depth of drilled wells and development of new processes for drilling wells, processing of high density muds, high viscosity muds and oil-based muds is inevitable, thereby leading conventional multi-stage solid phase control systems more and more difficult to adapt to the current situation. Thus, there has been an urgent need to develop a new mud solid phase control system, which principally consisting of a translational elliptical multilayer ultra-wide screen shaker, a solid-liquid separator and a large capacity centrifugal machine, to replace the existing multi-stage solid phase control systems. The existing conventional multi-stage mud solid phase control systems principally comprise a plurality of common shakers, a de-sander, a de-silter, a sand pump, a degasser, a centrifugal machine, etc, and equipment purchase cost, electric power consumption, area of land required, maintenance cost and system administration workload involved are all high. In addition, they fail when processing the high density muds, the high viscosity muds or the oil-based muds. Further, the performance of the de-sander and the de-silter is unstable. Once the upstream shaker fails to work effectively, the following machines such as the de-sander, the de-silter, the sand pump and the centrifugal machine cannot operate properly.

SUMMARY

To overcome the above-mentioned disadvantages of the existing system, the present invention provides a new system and a new process for mud solid phase control.

The above objective of the invention is achieved by the following technical solutions. The new system for mud solid control provided by the invention includes a translational elliptical multilayer ultra-wide screen shaker, a solid-liquid separator, a degasser, a large capacity centrifugal machine and a collector for shales. The shaker is provided with an 80 mesh screen, a 110 mesh screen and a 140 mesh screen. The solid-liquid separator includes a base which is provided with a feed tank and vibrating supports. The vibrating tank is fixed to the vibrating supports, and screen drums, vibration motors and an anti-vibration driving motor are assembled on the vibrating tank. The anti-vibration driving motor is connected to the screen drums. Each of the screen drums includes an inner drum, an intermediate drum and an outer drum, with the numbers of meshes being 140, 170 and 200, respectively.

When the system operates, each screen drum rotates around its own central axis. Simultaneously, it makes a translational elliptical vibration in longitudinal symmetry planes along with the vibrating tank to achieve mud solid-liquid separation by vibrating and rotating.

A new process for mud solid control of the invention includes the following steps: (a) removing over-sized solid particles: removing over-sized solid particles manually from a drilling mud with shales returned to the ground from downhole; (b) screening through screen meshes: after the over-sized particles are removed, the mud is separated by a translational elliptical multilayer ultra-wide shaker equipped with an 80 mesh screen, a 110 mesh screen and a 140 mesh screen successively; (c) separating solids and liquids: separating the mud which has been screened via a solid-liquid separator to achieve separation by vibration and rotation of a 140 mesh screen drum, a 170 mesh screen drum and a 200 mesh screen drum thereof successively, and collecting the separated solid shales via a collector; (d) removing gas: feeding the mud after separation into a degasser to remove gas; and (e) centrifuging the mud: after the gas is removed, the mud enters into a large capacity centrifugal machine to complete the mud solid control.

Compared to the existing system, the present invention has advantages as described below. Both the translational elliptical multilayer ultra-wide screen shaker and the solid-liquid separator of the invention are new devices for mud solid control and fill a gap in current domestic and overseas technology. The system of the invention replaces the conventional five-stage solid control system, which comprises a de-sander, a de-silter, a sand pump, etc, simplifying the process for mud solid control and devices involved and having great practical significance and profound development significance in aspects of effect, cost, energy saving, environmental protection, less occupied area, simple maintenance and management of devices, etc.

BRIEF DESCRIPTION OF THE DRAWINGS

Various additional features and advantages of the invention will become more apparent to those of ordinary skill in the art upon review of the following detailed description of one or more illustrative embodiments taken in conjunction with the accompanying drawings. The accompanying drawings, which are incorporated in and constitute a part of this specification, illustrate one or more embodiments of the invention and, together with the general description given above and the detailed description given below, explain the one or more embodiments of the invention.

DETAILED DESCRIPTION

The invention will be further described below in detail with reference to the accompanying drawings.

Figure 1:
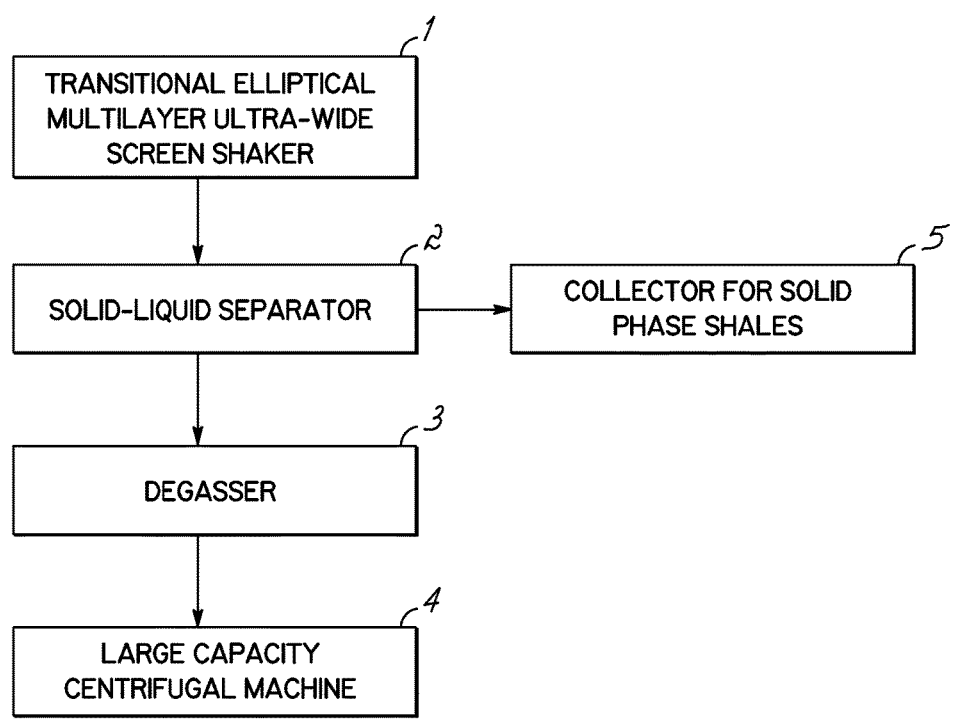
FIG. 1 is a schematic view of a new system for mud solid control according to the invention.
Figure 2:
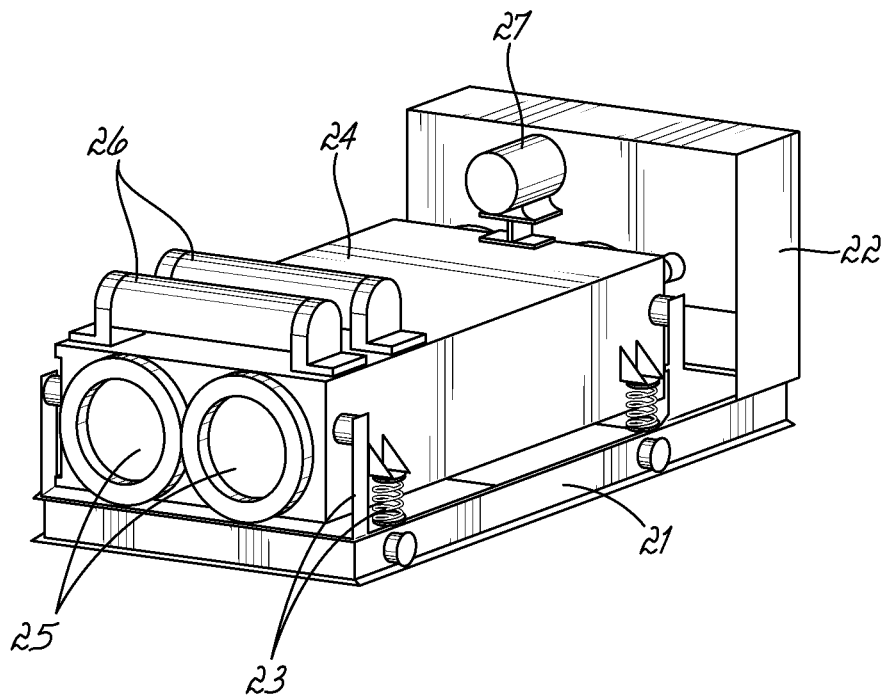
FIG. 2 is a schematic view of a solid-liquid separator according to the invention.
Figure 3:
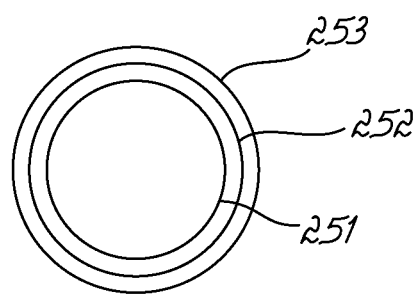
FIG. 3 is a schematic view of a screen drum according to the invention.

As shown in FIGS. 1 through 3, a new system for mud solid control of the invention includes a translational elliptical multilayer ultra-wide screen shaker 1, a solid-liquid separator 2, a degasser 3, a large capacity centrifugal machine 4 and a collector 5 for solid shales. The translational elliptical multilayer ultra-wide screen shaker 1 is provided with an 80 mesh screen, a 110 mesh screen and a 140 mesh screen. The solid-liquid separator includes a base 21 which is provided with a feed tank 22 and vibrating supports 23. The vibrating tank 24 is fixed to the vibrating supports 23. Screen drums 25, vibration motors 26 and an anti-vibration driving motor 27 are assembled on the vibrating tank. The anti-vibration driving motor 27 is connected to the screen drums 25. Each of the screen drums 25 includes an inner drum 251, an intermediate drum 252 and an outer drum 253, with the numbers of meshes being 140, 170 and 200, respectively.

When the system operates, each screen drum 25 rotates around its own central axis. Simultaneously, it produces a translational elliptical vibration in longitudinal symmetry planes along with the vibrating tank to achieve mud solid-liquid separation by vibrating and rotating.

A new process for mud solid control according to the invention includes steps of: (a) removing over-sized solid particles: removing over-sized solid particles manually from a drilling mud with shales returned to the ground from downhole; (b) screening through screen meshes: after the over-sized particles are removed, the mud is separated by a translational elliptical multilayer ultra-wide shaker equipped with an 80 mesh screen, a 110 mesh screen and a 140 mesh screen successively; (c) separating solids and liquids: separating the mud which has been screened via a solid-liquid separator to achieve separation of solid shales by vibration and rotation of a 140 mesh screen drum, a 170 mesh screen drum and a 200 mesh screen drum thereof successively, and collecting the separated solid shales via a collector; (d) removing gas: feeding the mud after separation into a degasser to remove gas; and (e) centrifuging the mud: after the gas is removed, the mud enters into a large capacity centrifugal machine to complete the mud solid control.

The forgoing is merely a description of one or more preferred embodiments of the present invention and not intended to limit the patent scope of the present invention, and any equivalent structures or equivalent flow variations made by using the description and accompanying drawings of the present invention, no matter whether it is directly or indirectly used in any other related technical field, should be included within the protection scope of the present invention.

What is claimed is:

1. A system for mud solid control, comprising:
    a translational elliptical multilayer screen shaker;
    a degasser;
    a solid-liquid separator;
    a centrifugal machine; and
    a collector for solid shales;
    wherein the solid-liquid separator comprises a base which is provided with a feed tank and vibrating supports,
    a vibrating tank on which screen drums, vibration motors and an anti-vibration driving motor are assembled is fixed to the vibrating supports,
    the anti-vibration driving motor is connected to the screen drums, and
    each of the screen drums comprises an inner drum having a 140 mesh screen, an intermediate drum having a 170 mesh screen, and an outer drum having a 200 mesh screen,
    wherein the screen drums rotate and vibrate to achieve solid-liquid separation of mud entering the screen drums, with liquids of the mud moving through the mesh screen of the inner drum, then the intermediate drum, and then the outer drum successively, with solids of the mud transported by vibration out of the screen drums.

2. The system for mud solid control of claim 1, wherein the translational elliptical multilayer screen shaker is provided with an 80 mesh screen, a 110 mesh screen, and a 140 mesh screen.

3. A process for mud solid control, comprising:
    (a) removing solid particles from a drilling mud with shales returned to the ground from downhole;
    (b) after the solid particles are removed, screening through screen meshes, which includes separating the drilling mud by a translational elliptical multilayer shaker equipped with an 80 mesh screen, a 110 mesh screen, and a 140 mesh screen, successively;
    (c) separating solids and liquids, which includes separating the drilling mud which has been screened via a solid-liquid separator to achieve separation of solid shales by vibration and rotation of a 140 mesh screen inner drum, a 170 mesh screen intermediate drum, and a 200 mesh screen outer drum thereof successively, and collecting the separated solid shales via a collector, with the drums mounted on a vibrating tank which is fixed to vibrating supports, wherein liquids of the drilling mud move through the mesh screen of the inner drum, then the intermediate drum, and then the outer drum successively, with solids of the mud transported by vibration out of the drums;
    (d) feeding the drilling mud after separation into a degasser to remove gas; and
    (e) after the gas is removed, centrifuging the drilling mud by placing the drilling mud into a centrifugal machine.

* * * * *